(12) United States Patent
Thrap et al.

(10) Patent No.: US 6,330,176 B1
(45) Date of Patent: Dec. 11, 2001

(54) MULTI-INPUT POWER TRANSFER AND UNINTERRUPTIBLE POWER SUPPLY APPARATUS AND METHODS OF OPERATION THEREOF

(75) Inventors: Guy C. Thrap, Del Mar; Dinesh Shah, San Diego, both of CA (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/713,431

(22) Filed: Nov. 15, 2000

(51) Int. Cl.$^7$ .................................................... H02M 1/10
(52) U.S. Cl. .............................................. 363/142; 307/86
(58) Field of Search ............................... 363/142; 307/43, 307/64, 85, 86

(56) References Cited

U.S. PATENT DOCUMENTS

| | | |
|---|---|---|
| 4,021,678 | 5/1977 | Moakler et al. ........................ 307/64 |
| 4,763,013 | 8/1988 | Gvoth, Jr. et al. ..................... 307/66 |
| 5,023,469 | 6/1991 | Bassett et al. ......................... 307/64 |
| 5,138,547 | 8/1992 | Swoboda ............................... 363/143 |
| 5,748,432 | 5/1998 | Przywozny et al. .................. 361/159 |
| 5,790,391 | 8/1998 | Stich et al. ............................. 363/24 |
| 5,939,799 | 8/1999 | Weinstein ............................... 307/64 |
| 5,939,802 | 8/1999 | Hornbeck ............................... 307/87 |
| 6,011,327 | 1/2000 | Cook et al. ........................... 307/125 |
| 6,051,893 * | 4/2000 | Yamamoto et al. .................... 307/43 |
| 6,137,706 | 10/2000 | Nesbitt et al. ........................ 363/142 |

* cited by examiner

Primary Examiner—Adolf Deneke Berhane
(74) Attorney, Agent, or Firm—Myers Bigel Sibley & Sajovec

(57) ABSTRACT

A power transfer apparatus includes a first switch operative to couple and decouple a first AC power source to and from an AC power bus responsive to a first control signal and a second switch operative to couple and decouple a second AC power source to and from the AC power bus responsive to a second control signal. A first switch control circuit generates the first control signal responsive to a first AC source voltage produced by the first AC power source and to a first inhibit signal and generates a second inhibit signal responsive to a state of the first switch. A second switch control circuit generates the second control signal responsive to a second AC source voltage produced by the second AC power source and to the second inhibit signal and generates the first inhibit signal responsive to a state of the second switch. In some embodiments, the first control signal may comprise a current in a coil of a relay that couples and decouples the first AC power source to and from the AC power bus responsive to the coil current. A relay driver circuit may control the coil current responsive to the enable signal and the first inhibit signal. A current detector circuit may generate the second inhibit signal responsive to the coil current. Related uninterruptible power supply (UPS) systems and methods are also discussed.

45 Claims, 8 Drawing Sheets

MULTI-INPUT POWER TRANSFER AND UNINTERRUPTIBLE POWER SUPPLY APPARATUS AND METHODS OF OPERATION THEREOF

BACKGROUND OF THE INVENTION

The present invention relates to power transfer apparatus and methods, and more particularly, to apparatus and methods for transferring power to a load from multiple alternative sources.

Computers, computer networks, telecommunications networks, medical equipment and other infrastructure often utilize redundant power sources to ensure that services and data are maintained in the event of loss or degradation of a primary power source, such as an AC utility line. For example, computers and network devices often are powered by uninterruptible power supplies (UPSs) that can maintain an AC supply from an alternative source, such as a battery-powered inverter.

In many applications, multiple sources of AC power may be available. For example, a load may be served from either a "preferred" source, such as an AC utility line, or from a less preferred secondary source, such as a motor-generator set. These multiple AC power sources may be supplied to a transfer switch that selectively connects the multiple AC power sources to a common AC power bus connected to the load. The transfer switch may operate automatically responsive to voltage or other conditions associated with the multiple AC power sources and/or the load. An example of such a transfer switch apparatus is described in U.S. Pat. No. 6,137,706 to Nesbitt et al.

SUMMARY OF THE INVENTION

According to embodiments of the invention, a power transfer apparatus for selectively transferring power to an AC power bus from first and second AC power sources is provided. The power transfer apparatus includes a first switch operative to couple and decouple the first AC power source to and from the AC power bus responsive to a first control signal and a second switch operative to couple and decouple the second AC power source to and from the AC power bus responsive to a second control signal. The apparatus also includes a first switch control circuit that generates the first control signal responsive to a first AC source voltage produced by the first AC power source and to a first inhibit signal and that generates a second inhibit signal responsive to a state of the first switch. The apparatus further includes a second switch control circuit that generates the second control signal responsive to a second AC source voltage produced by the second AC power source and to the second inhibit signal and that generates the first inhibit signal responsive to a state of the second switch.

According to some embodiments of the invention, the first switch control circuit includes a voltage detector circuit operative to generate an enable signal responsive to the first AC source voltage and a driver circuit operative to generate the first control signal responsive to the enable signal and the first inhibit signal. The first switch control circuit further includes an inhibit signal generator circuit operative to generate the second inhibit signal responsive to the first control signal.

For example, the first switch may include a relay including a switching element coupled to the AC power bus and configured to be coupled to the first AC power source and a coil operative to cause the switching element to couple and decouple the AC power source to and from the AC power bus responsive to a current in the coil. The driver circuit may include a relay driver circuit that controls the current in the coil responsive to the enable signal and the first inhibit signal. The inhibit signal generator circuit may include a current detector circuit operative to generate the second inhibit signal responsive to the current in the coil.

In other embodiments of the invention, the first switch control circuit is operative to cause the first switch to couple the first AC power source to the AC power bus when the first AC source voltage meets a first predetermined criterion and the first inhibit signal is deasserted. The first switch control circuit is also operative to cause the first switch to decouple the first AC power source from the AC power bus when the first AC source voltage fails to meet the first predetermined criterion. The first switch control circuit is further operative to cause the first switch to decouple the first AC power source from the AC power bus when the first inhibit signal is asserted. The second switch control circuit may operate in a similar fashion.

In still other embodiments of the invention, the first switch control circuit is further operative to assert the second inhibit signal when the first switch couples the first AC power source to the AC power bus, to maintain assertion of the second inhibit signal for a first predetermined interval following decoupling of the first AC power source from the AC power bus, and to deassert the second inhibit signal following the first predetermined interval. The second switch control circuit is further operative to cause the second switch to decouple the second AC power source from the AC power bus responsive to assertion of the second inhibit signal. The second switch control circuit may similarly generate the first inhibit signal to control operation of the first switch.

In yet other embodiments of the invention, the first switch control circuit is further operative to generate the first control signal responsive to the first AC source voltage, to the first inhibit signal and to a third inhibit signal. In such embodiments, the second switch control is further operative to generate the second control signal responsive to the second AC source voltage, to the second inhibit signal and to a fourth inhibit signal. The power transfer apparatus further includes a communications interface circuit configured to receive external signals on an external signal line and operative to generate the third and fourth inhibit signals responsive thereto. The first switch control circuit may be further operative to generate a first status signal that is indicative of a status of the first switch control circuit, and the second switch control circuit may be further operative to generate a second status signal that is indicative of a status of the second switch control circuit. The communications interface circuit may be configured to receive the first and second status signals and operative to transmit signals on the external signal line responsive to the first and second status signals.

According to other aspects of the invention, an uninterruptible power supply (UPS) system is provided. The UPS system includes an AC power bus, a first switch operative to couple and decouple a first AC power source to and from the AC power bus responsive to a first control signal, and a second switch operative to couple and decouple a second AC power source to and from the AC power bus responsive to a second control signal. The system also includes a first switch control circuit that generates the first control signal responsive to a first AC source voltage produced by the first AC power source and to a first inhibit signal and that generates a second inhibit signal responsive to a state of the first switch, and a second switch control circuit that generates the second control signal responsive to a second AC source voltage produced by the second AC power source and to the second inhibit signal and that generates the first inhibit signal responsive to a state of the second switch. The system further includes a UPS subsystem having a first input coupled to the AC power bus and a second input configured to be coupled to a DC power source. The UPS subsystem is operative to generate an AC output voltage from an AC voltage at the first input or a DC voltage at the second input.

In some embodiments of the invention, the first switch control circuit is operative to assert the second inhibit signal when the first switch couples the first AC power source to the AC power bus, to maintain assertion of the second inhibit signal for a first predetermined interval following decoupling of the first AC power source from the AC power bus, and to deassert the second inhibit signal following the first predetermined interval. In such embodiments, the second switch control circuit is operative to cause the second switch to decouple the second AC power source from the AC power bus responsive to assertion of the second inhibit signal. The second switch control circuit is further operative to assert the first inhibit signal when the second switch couples the second AC power source to the AC power bus, to maintain assertion of the first inhibit signal for a second predetermined interval following decoupling of the second AC power source from the AC power bus, and to deassert the first inhibit signal following the second predetermined interval. The first switch control circuit is further operative to cause the first switch to decouple the first AC power source from the AC power bus responsive to assertion of the first inhibit signal. The UPS subsystem may be operative to generate the AC output voltage from a DC voltage at the second input in the first and second predetermined intervals.

In still other embodiments of the invention, the first switch control circuit is further operative to generate the first control signal responsive to the first AC source voltage, to the first inhibit signal and to a third inhibit signal. In such embodiments, the second switch control is further operative to generate the second control signal responsive to the second AC source voltage, to the second inhibit signal and to a fourth inhibit signal. The system further includes a communications interface circuit configured to receive externally applied signals on an external signal line and operative to generate the third and fourth inhibit signals responsive thereto. A controller circuit is coupled to the UPS subsystem and to the external signal line and is operative to generate the externally applied signals. The controller circuit may be operative to generate signals on the external signal line that cause the first and second control circuits to decouple the first and second AC power sources from the AC power bus and to cause the UPS subsystem to concurrently generate the AC output voltage from the DC power source.

The first switch control circuit may be operative to generate a first status signal that is indicative of a status of the first switch control circuit. The second switch control circuit may be operative to generate a second status signal that is indicative of a status of the second switch control circuit. The communications interface circuit may be configured to receive the first and second status signals and operative to transmit signals on the external signal line responsive to the first and second status signals. The controller circuit may be operative to receive the transmitted signals and, responsive to the first and second status signals, to cause the UPS subsystem to generate the AC output voltage from the DC voltage at the second input when the first and second AC source voltages are unacceptable.

According to embodiments of method aspects of the invention, power is selectively transferred to an AC power bus from first and second AC power sources. First and second switches are operative to couple and decouple the first and second AC power sources to and from the AC power bus responsive to first and second control signals are provided. The first control signal is generated responsive to a first AC source voltage produced by the first AC power source and to a first inhibit signal. The second control signal is generated responsive to a second AC source voltage produced by the second AC power source and to a second inhibit signal. The first inhibit signal is generated responsive to a state of the second switch. The second inhibit signal is generated responsive to a state of the first switch. An AC output voltage may be selectively generated from an AC voltage on the AC power bus or from a DC voltage produced by a DC power source. For example, an UPS may be coupled to the AC power bus, and may be operated such that it generates an AC output voltage from a DC power source in an interval during which the first and second switches decouple the first and second AC power sources from the AC power bus.

Embodiments of the invention can provide several advantages over conventional AC transfer switching techniques. The invention may be embodied using relatively fewer switching devices, e.g., relays, than those used in conventional transfer switching techniques. In addition, switch control techniques used in embodiments of the invention may be less complex and more fault tolerant than switch control techniques used in conventional transfer switch arrangements. Embodiments of the invention may also take advantage of the ability of an uninterruptible power supply to provide continuity in power to a load during a switch between first and second power sources. Transfer switching capability according to embodiments of the invention can also be integrated with such an uninterruptible power supply to provide a multiple AC input uninterruptible power supply system. Although the present application describes use of power transfer apparatus according to embodiments of the invention to provide AC power to an uninterruptible power supply, it will be understood that apparatus and methods according to the invention are also applicable to providing power to loads other than uninterruptible power supplies.

DETAILED DESCRIPTION

Figure 1:
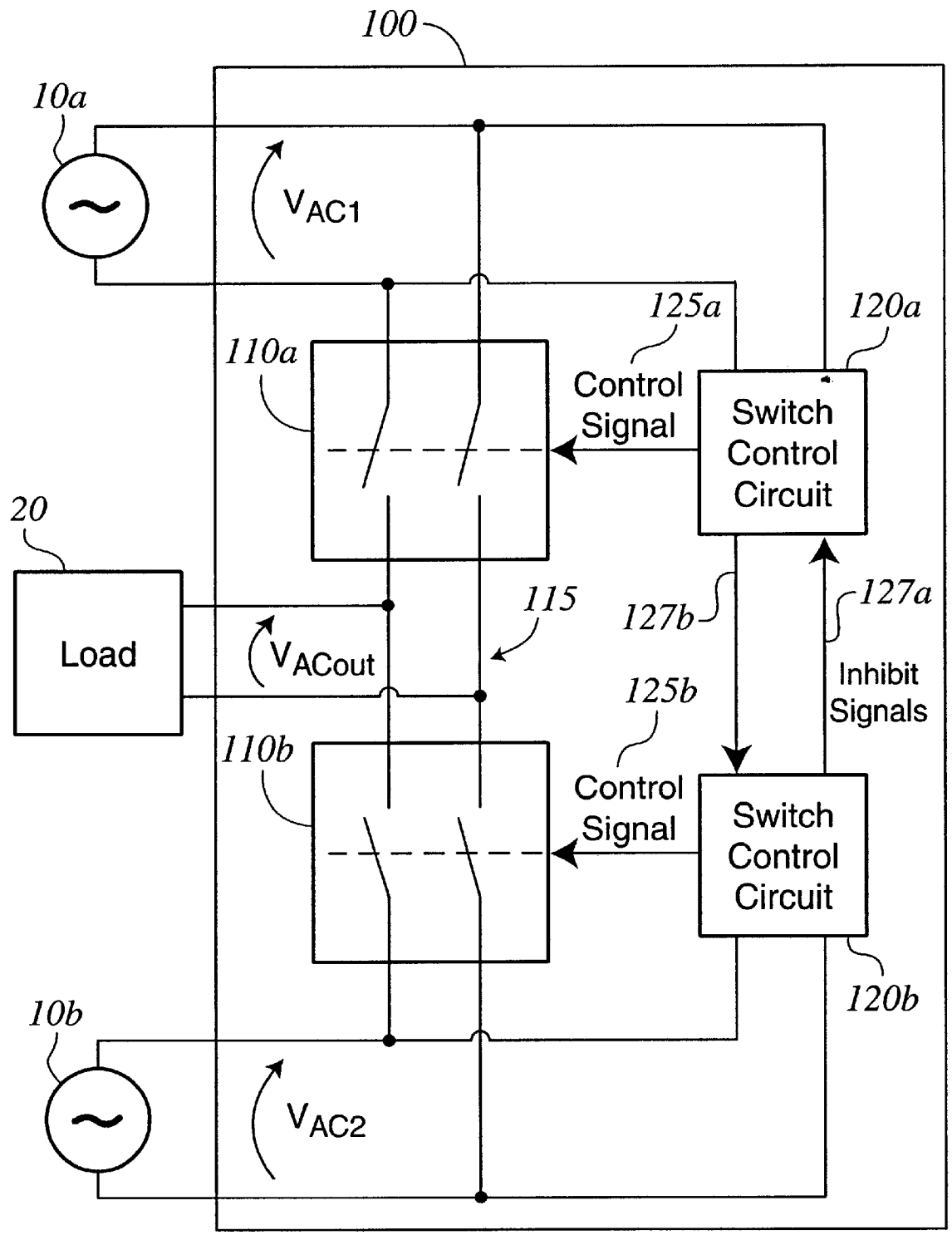
FIG. 1 is a schematic diagram illustrating a power transfer apparatus according to embodiments of the invention.

The present invention now will be described more fully with reference to the accompanying drawings, in which specific embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1 illustrates a power transfer apparatus 100 for selectively connecting first and second AC power sources 10a, 10b to a load 20 via an AC power bus 115 to produce an AC output voltage $V_{ACout}$ according to embodiments of the invention. The apparatus 100 includes a first switch 110a coupled to the power bus 115 and configured to be coupled to the first AC power source 10a. The first switch 110a is controlled responsive to a first control signal 125a generated by a first switch control circuit 120a. The first switch control circuit 120a generates the first control signal 125a responsive to an AC voltage $V_{AC1}$ produced by the first power source 10a subject to a first inhibit signal 127a. In particular, the switch control circuit 120a causes the first switch 110a to decouple the first AC source 10a from the AC power bus 115 if the first AC voltage $V_{AC1}$ fails to meet a predetermined criterion, e.g., if the magnitude of the first AC voltage $V_{AC1}$ falls outside of a predetermined window, or if the first inhibit signal 127a is asserted. The first switch control circuit 120a is further operative to generate a second inhibit signal 127b responsive to a state of the first switch 110a. In particular, the second inhibit signal 127b may be asserted when the first switch 110a is closed to prevent closure of a second switch 110b coupled to the power bus 115 and configured to be coupled to a second AC power source 10b.

The second switch 110b is controlled responsive to a second control signal 125b generated by a second switch control circuit 120b. The second switch control circuit 120b generates the second control signal 125b responsive to an AC voltage $V_{AC2}$ produced by the second power source 10b, subject to the second inhibit signal 127b. In particular, the second switch control circuit 120b causes the second switch 110b to decouple the second AC source 10b from the AC power bus 115 if the second AC voltage $V_{AC2}$ fails to meet a predetermined criterion, e.g., if the magnitude of the second AC voltage VAC2 falls outside of a predetermined window, or if the second inhibit signal 127b is asserted. The second switch control circuit 120b is further operative to generate the first inhibit signal 127a responsive to a state of the second switch 110b. In particular, the first inhibit signal 127a may be asserted when the second switch 110b is closed to prevent closure of the first switch 110a.

It will be appreciated that the apparatus 100 may be implemented using a number of different components. For example, the switches 110a, 110b may include any of a variety of different switching devices, including electromechanical and solid state switching devices. The switch control circuits 120a, 120b may be implemented using a variety of different devices, including special purpose analog and/or digital circuitry, programmable circuits such as programmable logic devices, microprocessors, and microcontrollers, and combinations thereof.

Figure 2:
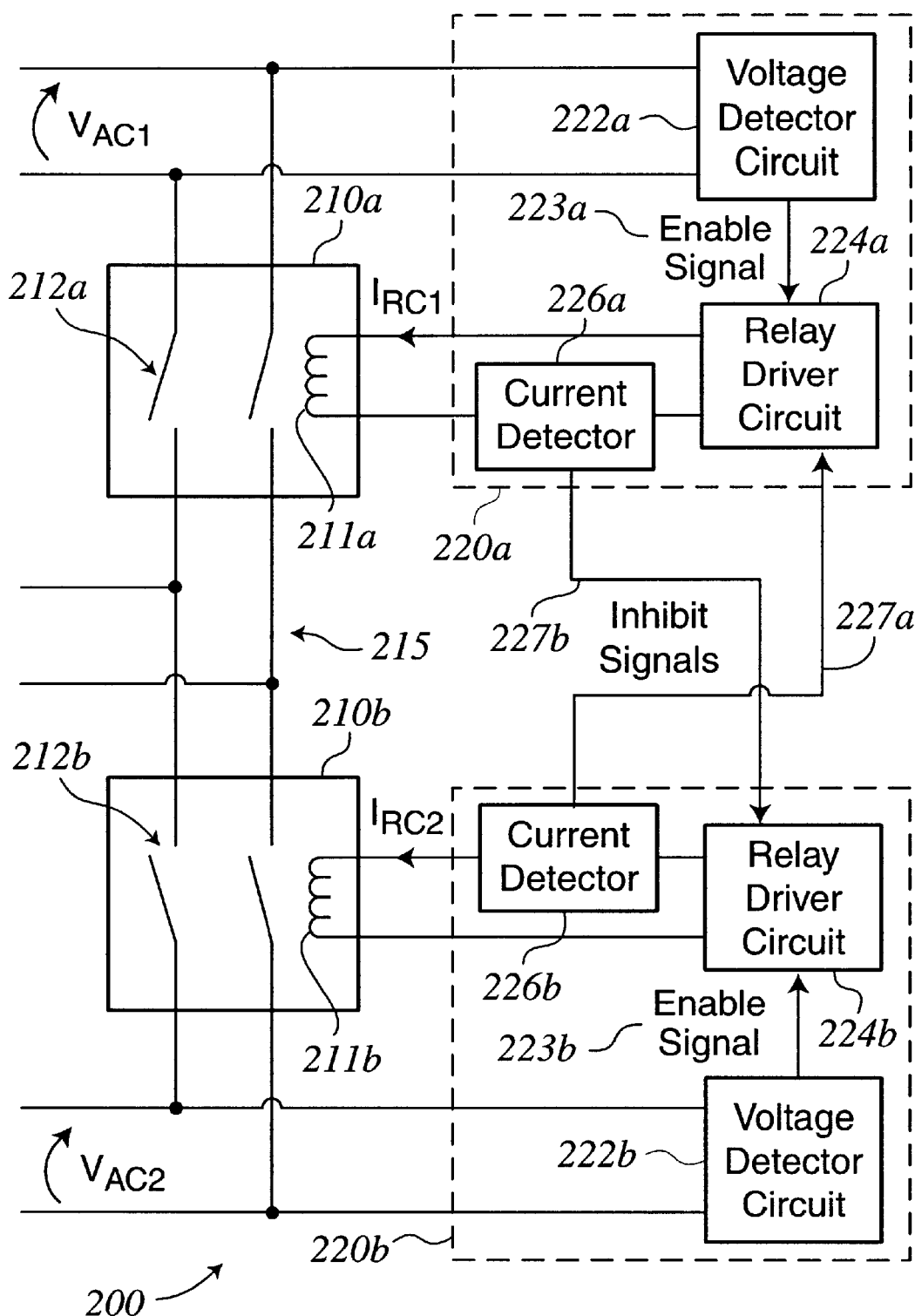
FIG. 2 is a schematic diagram illustrating a power transfer apparatus according to other embodiments of the invention.

FIG. 2 illustrates a power transfer apparatus 200 according to some embodiments of the invention. The apparatus 200 includes first and second relays 210a, 210b that are coupled to an AC power bus 215 and configured to be coupled to respective first and second AC power sources (not shown) that produce AC voltages $V_{AC1}$, $V_{AC2}$. The first and second relays 210a, 210b include switching elements 212a, 212b that are actuated by coils 211a, 211b and are controlled by respective first and second relay control circuits 220a, 220b. The first relay control circuit 220a includes a first voltage detector circuit 222a configured to receive the first AC voltage $V_{AC1}$ and operative to generate a first enable signal 223a therefrom. The first relay control circuit 220a also includes a first relay driver circuit 224a that controls a current $I_{RC1}$ through the coil 211a of the first relay 210a responsive to the first enable signal 223a, subject to a first inhibit signal 227a generated by the second relay control circuit 220b. The first relay control circuit 220a also includes a first current detector circuit 226a that generates a second inhibit signal 227b responsive to the current $I_{RC1}$ in the coil 211a of the first relay 210a.

The second relay control circuit 220b includes a second voltage detector circuit 222b configured to receive the second AC voltage $V_{AC2}$ and operative to generate a second enable signal 223b therefrom. The second relay control circuit 220b also includes a second relay driver circuit 224b that controls a current $I_{RC2}$ through the coil 211b of the second relay 210b responsive to the second enable signal 223b, subject to the second inhibit signal 227b generated by the first relay control circuit 220b. The second relay control circuit 220b further includes a second current detector circuit 226b that generates the first inhibit signal 227a responsive to the current $I_{RC2}$ in the coil 211b of the second relay 210b.

Figure 3:
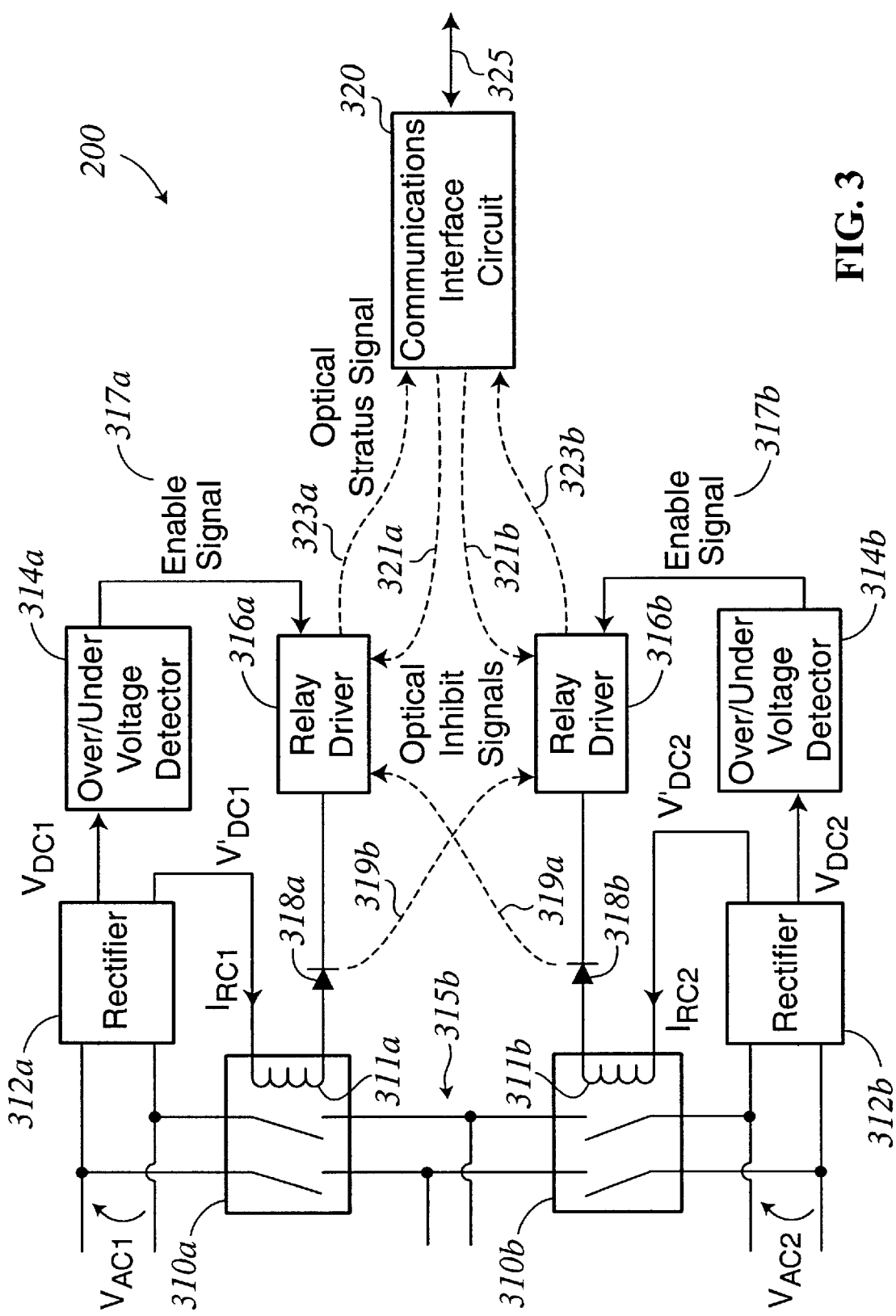
FIG. 3 is a schematic diagram illustrating a power transfer apparatus according to still other embodiments of the invention.

FIG. 3 illustrates a power transfer apparatus 300 according to further embodiments of the invention. The apparatus 300 includes first and second relays 310a, 310b that are operative to couple respective first and second AC power sources (not shown), which produce first and second AC voltages $V_{AC1}$, $V_{AC2}$, to an AC power bus 315. A first rectifier circuit 312a is configured to receive the first AC voltage $V_{AC1}$ and to produce DC voltages $V_{DC1}$, $V'_{DC1}$ therefrom. A first over/under voltage detector circuit 314a receives the DC voltage $V_{DC1}$ and generates a first enable signal 317a responsive thereto, i.e., such that the first enable signal 317a is asserted when the magnitude of the DC voltage $V_{DC1}$ is greater than a first predetermined level and less than a second predetermined level. The DC voltage $V'_{DC1}$ is applied to the coil 311a of the first relay 310a. A first relay driver circuit 316a receives the first enable signal 317a and controls a current $I_{RC1}$ drawn from the first rectifier circuit 312a and conducted through the coil 311a responsive to the first enable signal 317a and to optical inhibit signals 319a, 321a. The first relay driver circuit 316a also generates a first optical status signal 323a responsive to the first enable signal 317a. A light emitting diode (LED) 318a of an optocoupler is coupled in series with the relay coil 311a and generates an optical inhibit signal 319b responsive to the current $I_{RC1}$. Although the first rectifier circuit 312a is shown as producing separate DC voltages $V_{DC1}$, $V'_{DC1}$, it will be appreciated that the first rectifier circuit 312a could be configured to supply a common DC voltage to both the coil 311a and the first over/under voltage detector circuit 314a.

A second rectifier circuit 312b is configured to receive the second AC voltage $V_{AC2}$ and to produce DC voltages $V_{DC2}$, $V'_{DC2}$ therefrom. A second over/under voltage detector circuit 314b receives the DC voltage $V_{DC2}$ and generates a second enable signal 317b responsive thereto, i.e., such that the second enable signal 317b is asserted when the magnitude of the DC voltage $V_{DC2}$ is greater than a third predetermined level and less than a fourth predetermined level. The DC voltage $V'_{DC2}$ is applied to the coil 311b of the second relay 310b. A second relay driver circuit 316b receives the second enable signal 317b and controls a current $I_{RC2}$ conducted through the coil 311b responsive to the second enable signal 317b and to optical inhibit signals 319b, 321b. The second relay driver circuit 316b also generates a second optical status signal 323b responsive to the second enable signal 317b. An LED 318b of an optocoupler is coupled in series with the relay coil 311b and generates the optical inhibit signal 319b responsive to the current $I_{RC2}$. Although the first rectifier circuit 312a is shown as producing separate DC voltages $V_{DC1}$, $V'_{DC1}$, it will be appreciated that the second rectifier circuit 312b could be configured to supply a common DC voltage to both the coil 311b and the second over/under voltage detector circuit 314b.

The apparatus 300 further includes a communications interface circuit 320 that receives the first and second optical status signals 323a, 323b, and that is operative to transmit signals on an external signal line 325 therefrom. The communications interface circuit 320 is further operative to generate the first and second optical inhibit signals 321a, 321b responsive to signals received on the external signal line 325.

Figure 4:
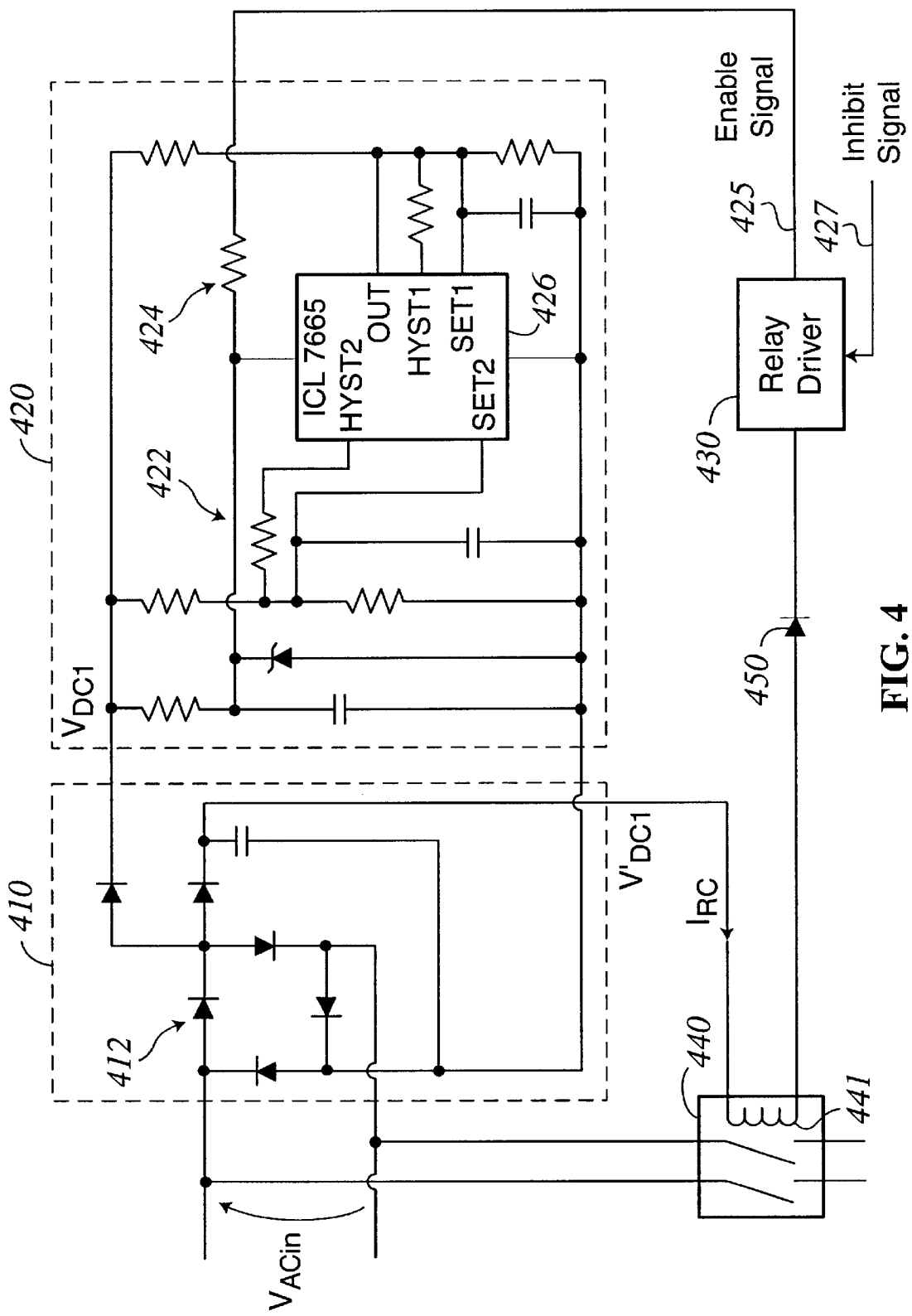
FIG. 4 is a schematic diagram illustrating a switch control circuit according to embodiments of the invention.

FIG. 4 illustrates a rectifier circuit 410 and an over/under voltage detector circuit 420 that may be used with the invention, for example, in the apparatus 300 of FIG. 3. The rectifier circuit 410 includes a full-wave rectifying diode bridge 412 that produce DC voltages $V_{DC}$, $V'_{DC}$, from an AC input voltage $V_{ACin}$. The DC voltage $V'_{DC}$ is applied to a coil 441 of a relay 440 that receives the AC input voltage $V_{ACin}$. The over/under voltage detector circuit 420 receives the DC voltage $V_{DC}$ and includes a first voltage divider/filter circuit 422 that is coupled to first and second inputs SET2, HYST2 of a over/under voltage detector integrated circuit (IC), here shown as a ICL7665 CMOS Micropower Over/Under Voltage Detector IC 426 available from Intersil. The over/under voltage detector circuit 420 also includes a second voltage divider/filter circuit 424 coupled to third and fourth inputs SET1, HYST1 of the IC 426. An enable signal 425 is generated by the IC 426 responsive to scaled and filtered DC voltages produced by the first and second voltage divider/ filter circuits 422, 424. Operational characteristics of the IC 426 are well known and described in a data sheet entitled Intersil CMOS Micropower Over/Under Voltage Detector, published by Intersil, April 1999. The enable signal 425 is provided to a relay driver circuit 430, which controls a current $I_{RC}$ in the coil 441 responsive to the enable signal 425 and subject to an inhibit signal 427, which may be, as described above, an optical signal.

Figure 5:
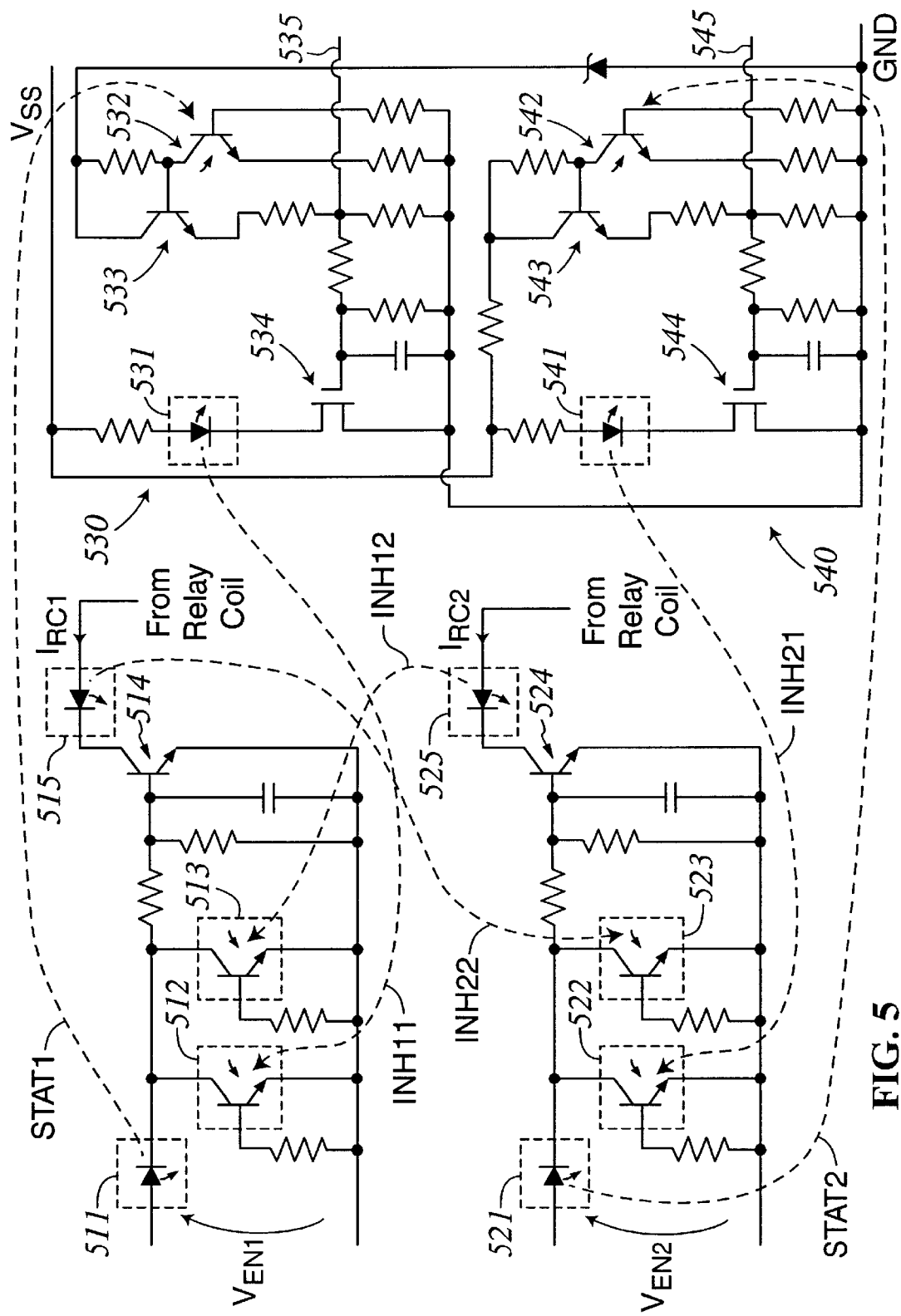
FIG. 5 is a schematic diagram illustrating relay driver and communications circuits according to embodiments of the invention.

FIG. 5 illustrates a first relay driver circuit 510, a second relay driver circuit 520, and first and second communications circuits 530, 540 according to embodiments of the invention that may be used, for example, in the apparatus 300 of FIG. 3. The first and second relay driver circuits 510, 520 and the first and second communications circuits 530, 540 are linked by optical signals STAT1, INH22, STAT2, INH12, INH11, INH21 that are generated by respective LEDS 511, 515, 521, 525, 531, 541 that are matched with respective phototransistors 532, 523, 542, 513, 512, 522. As described herein, a matched LED/phototransistor pair forms an optocoupler or optoisolator, and may be implemented in an integrated circuit or other fashion. As described herein, an optical signal produced by an LED, such as the optical signals INH11, INH12, INH21, INH22, STAT1, STAT2, is "asserted" when current through the LED is increased to the point that the corresponding phototransistor changes from a first state to a second state, e.g. from a non-conducting state to a conducting state. Conversely, an optical signal is "deasserted" when current through the LED is reduced to the point where the corresponding current changes state in an opposite fashion, e.g., from a conducting state to a non-conducting state. It will be understood that, although FIG. 5 illustrates a non-redundant arrangement in which a single optical signal path is provided for each optical signal, redundant optocouplers may be used, e.g., by placing additional phototransistors in parallel with the phototransistors shown and additional LEDS in series with the LEDs shown. It will also be understood that devices other than optocouplers, such as isolation transformers, may be used to provide functionally equivalent galvanic isolation.

The first relay driver circuit 510 includes a first relay driving transistor 514 that conducts a first relay coil current $I_{RC1}$ responsive to a first enable signal $V_{EN1}$. The first relay driver circuit 510 also includes the first and second phototransistors 512, 513, which are operative, responsive to respective ones of the optical inhibit signals INH11, INH12, to prevent the first relay driving transistor 514 from sinking the relay current $I_{RC1}$ responsive to the first enable signal $V_{EN1}$. The first relay driver circuit 510 also includes an LED 511 coupled in series with the base of the first relay driving transistor 514, that generates the optical status signal STAT1 responsive to the first enable signal $V_{EN1}$. The LED 515 is coupled in series with the first relay driving transistor 514 and produces the optical inhibit signal INH22 responsive to the relay coil current $I_{RC1}$.

The second relay driver circuit 520 includes a second relay driving transistor 524 that conducts a second relay coil current $I_{RC2}$ responsive to a second enable signal $V_{EN2}$. The second relay driver circuit 520 also includes the phototransistors 522, 523, which are operative, responsive to the respective optical inhibit signals INH21, INH22, to prevent the second relay driving transistor 524 from sinking the relay current $I_{RC2}$ responsive to the second enable signal $V_{EN2}$. The second relay driver circuit 520 also includes the LED 521 coupled in series with the base of the second relay driving transistor 524, which generates the optical status signal STAT2 responsive to the second enable signal $V_{EN2}$. The LED 525 is coupled in series with the second relay driving transistor 524 and produces the optical inhibit signal INH12 responsive to the relay coil current $I_{RC2}$.

The first and second communications circuits 530, 540 are each biased between a power supply voltage $V_{SS}$ (e.g., 5V) and a power supply ground GND. The first communications circuit 530 is coupled to an external signal line 535, which may be either driven by another device in a receive mode or which may present a high impedance in a transmit mode. The first communications circuit 530 includes the phototransistor 532, transistors 533, 534, the LED 531, and associated biasing circuitry. The phototransistor 532 receives the optical status signal STAT1. If the external signal line 535 is in a high-impedance transmit state, the phototransistor 532 is operative to force the signal line 535 to one of a first state or a second state depending on the state of the optical status signal STAT1. In particular, if the optical status signal STAT1 is deasserted, the phototransistor 532 applies a voltage to the base of the transistor 533, causing the signal line 535 to be pulled up toward the power supply voltage $V_{SS}$. If the optical status signal STAT1 is asserted, however, the base drive to the transistor 533 is reduced, causing the signal line 535 to be pulled down towards the power supply ground GND.

In the receive mode, the signal line 535 is driven by an external circuit (not shown). If the voltage applied by the external circuit is sufficiently high, the transistor 534 is turned "on", causing current to be conducted through the LED 531 and the optical inhibit signal INH11 to be asserted.

In response, the phototransistor 512 of the first relay driver circuit 510 conducts and prevents the first relay driving transistor 514 from sinking the relay current IRC1. If the signal line 535 is driven to a low level, the LED 531 does not conduct, allowing the first relay driver circuit 510 to sink current depending on the states of the optical inhibit signal INH12 and the first enable signal $V_{EN1}$.

The second communications circuit 540 is coupled to another external signal line 545, which may be either driven by another device in a receive mode or which may present a high impedance in a transmit mode. The second communications circuit 540 includes the phototransistor 542, transistors 543, 544, the LED 541 and associated biasing circuitry. The phototransistor 542 receives the optical status signal STAT2. If the external signal line 545 is in a high-impedance transmit state, the phototransistor 542 is operative to force the signal line 545 to one of a first state or a second state depending on the state of the optical status signal STAT2. In particular. if the optical status signal STAT2 is deasserted, the phototransistor 542 applies a voltage to the base of the transistor 543, causing the signal line 545 to be pulled up toward the power supply voltage $V_{SS}$. If the optical status signal STAT2 is asserted, however, the base drive to the transistor 543 is reduced, causing the signal line 545 to be pulled down towards the power supply ground GND.

In the receive mode, the signal line 545 is driven by an external circuit (not shown). If the voltage applied by the external circuit is sufficiently high, the transistor 544 is turned "on", causing current to be conducted through the LED 541 and the optical inhibit signal INH21 to be asserted. In response, the phototransistor 522 of the second relay driver circuit 520 conducts and prevents the second relay driving transistor 524 from sinking the relay current $I_{RC2}$. If the signal line 545 is driven to a low level, the LED 541 does not conduct, allowing the second relay driver circuit 520 to sink the relay current $I_{RC2}$ depending on the states of the optical inhibit signal INH22 and the second enable signal $V_{EN2}$.

Figure 6:
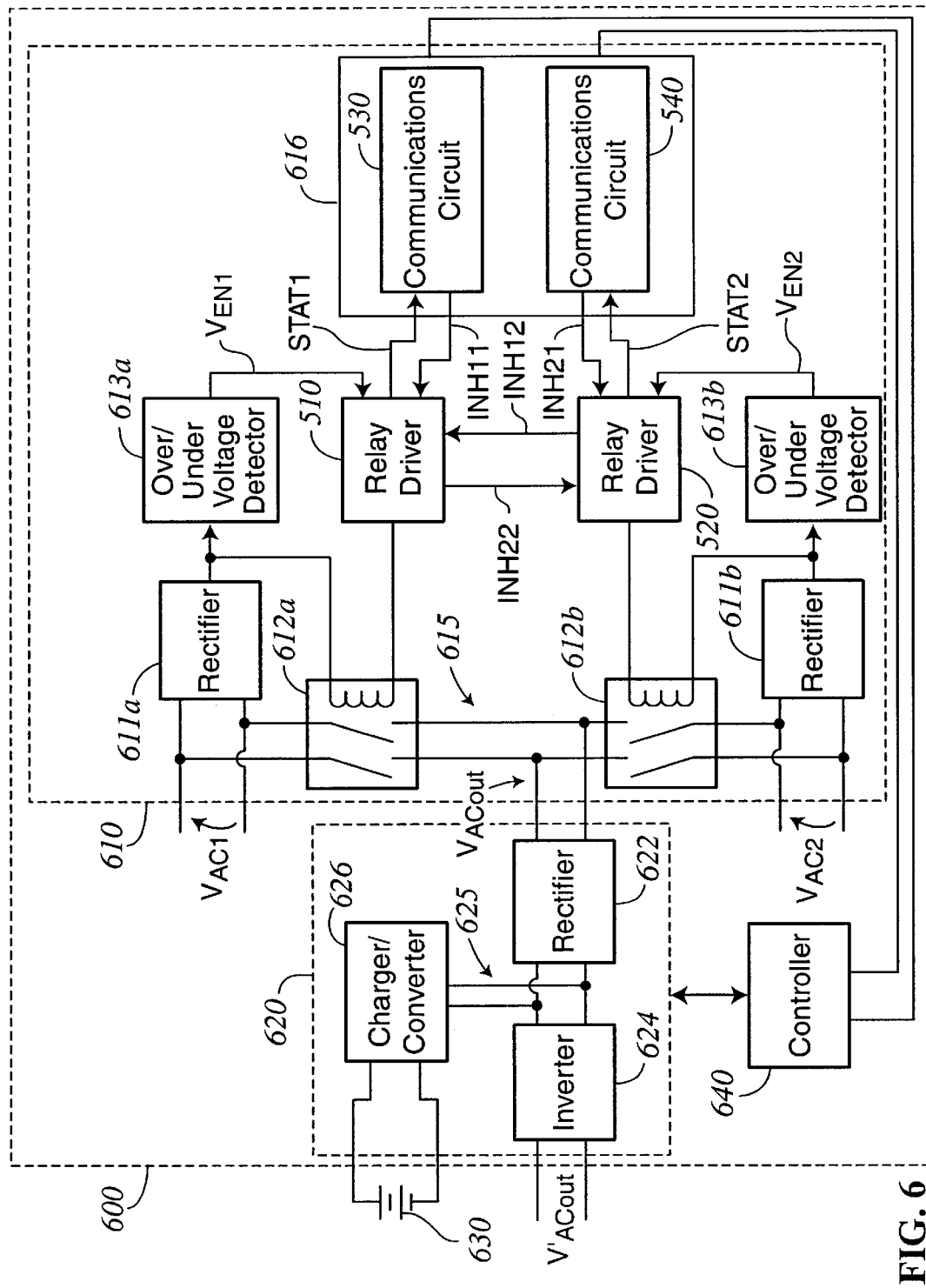
FIG. 6 is a schematic diagram illustrating an uninterruptible power supply (UPS) system according to embodiments of the invention.

FIG. 6 illustrates an uninterruptible power supply (UPS) system 600 according to embodiments of the invention that utilizes a power transfer apparatus 610 along the lines described above. The power transfer apparatus 610 includes rectifier circuits 611a, 611b and over/under voltage detector circuits 613a, 613b as described above. As shown, the power transfer apparatus 610 includes relay driver circuits 510, 520 linked by optical signals INH12, INH22, and a communications interface circuit 616 including communications circuits 530, 540 linked to the relay driver circuits 510, 520 by optical signals INH11, INH21, INH22, STAT1, STAT2 as described above with reference to FIG. 5. The relay driver circuits 510, 520 drive respective relays 612a, 612b that are operative to couple and decouple an AC power bus 615 to and from respective first and second AC power sources producing AC voltages $V_{AC1}$, $V_{AC2}$.

The system 600 further includes a UPS subsystem 620, here shown as an "on-line" type UPS including a rectifier circuit 622 that is coupled to the AC power bus 615. The rectifier circuit 622 is coupled to an inverter circuit 624 by a DC power bus 625. The rectifier circuit 622 is operative to produce a DC voltage on the DC power bus 625 from an AC voltage $V_{ACout}$ on the AC power bus 615. A DC/DC converter circuit 626 is also coupled to the DC power bus 625, and is operative to produce a DC voltage on the DC power bus 625 from a DC voltage supplied by a battery 630 or other DC power source (which may be included in the system 600). The inverter circuit 624 is operative to produce a second AC Output voltage $V'_{ACout}$ from a DC voltage on the DC power bus 625. A controller 640 controls operations of the UPS subsystem 620 such that the AC output voltage $V'_{ACout}$ is maintained at a desired state, even when the AC voltage $V_{ACout}$ on the AC power bus 615 fails or is degraded. Operations of a UPS subsystem such as the UPS subsystem 620 are well known to those skilled in the art, and will not be described in greater detail. It will also be appreciated that the UPS subsystem 620 is described for exemplary purposes, and that other UPS subsystems, e.g., systems with circuit configurations other than the "online" configuration illustrated may be used with the invention.

Figure 7:
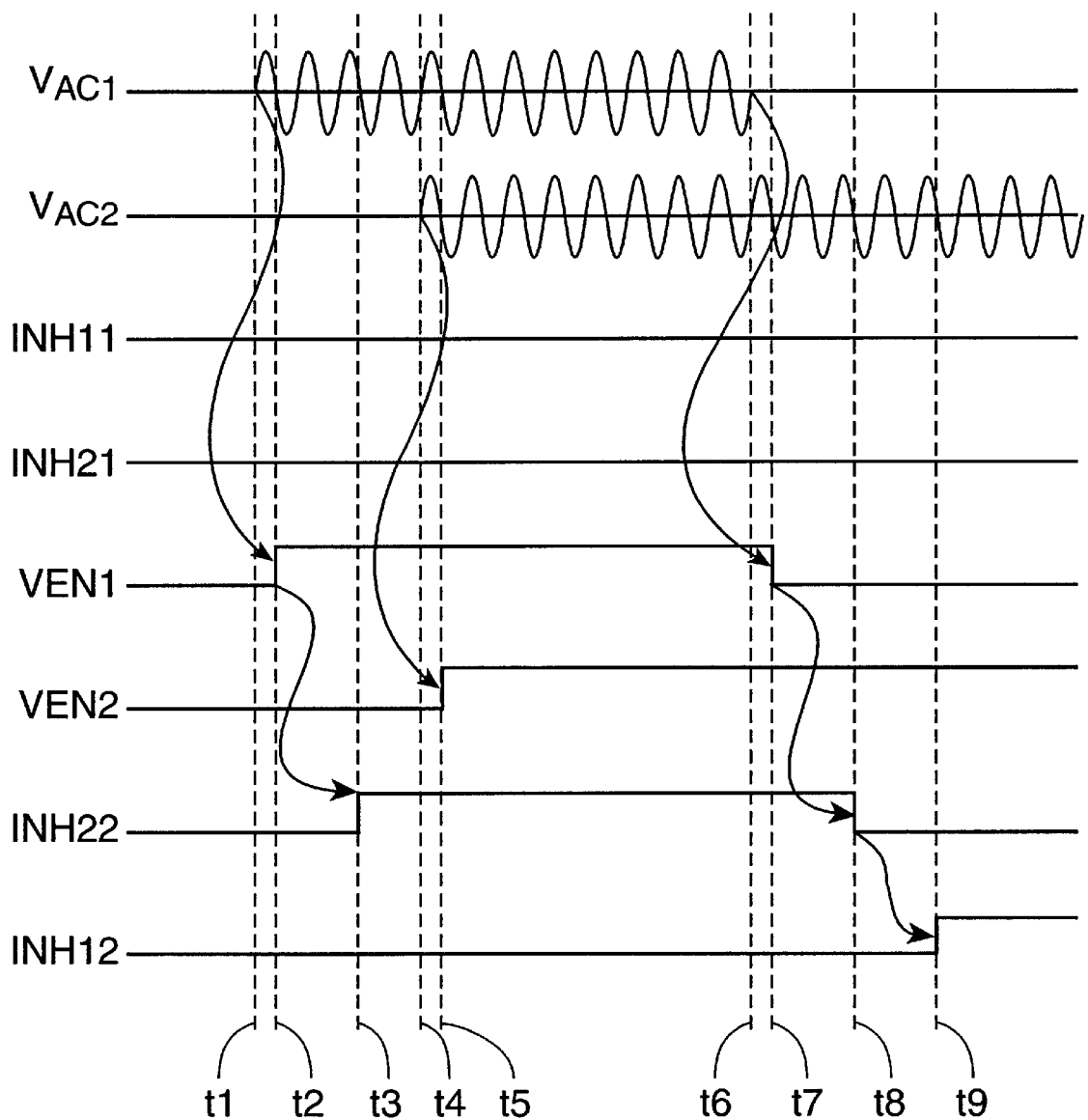
FIGS. 7 and 8 are waveform diagrams illustrating exemplary operations of the UPS system of FIG. 6 according to embodiments of the invention.

FIG. 7 is a waveform diagram illustrating exemplary operations of the UPS system 600 of FIG. 6 according to embodiments of the invention. For purposes of FIG. 7, the inhibit signals INH11, INH21 produced by the communications circuits 530, 540 are assumed to be deasserted. Initially, the first and second AC voltages $V_{AC1}$, $V_{AC2}$ are approximately zero volts, thus causing the first and second enable signal $V_{EN1}$, $V_{EN2}$ to be initially deasserted. Responsive to the first AC voltage $V_{AC1}$ meeting a predetermined criterion at time t1, the first enable signal is asserted at subsequent time t2. This enables the first relay driver circuit 510 to drive the relay 612 such that the first AC voltage $V_{AC1}$ is applied to the AC power bus 615. In response, the inhibit signal INH22 is asserted at time t3.

After the second AC voltage $V_{AC2}$ meets a predetermined criterion at time t4, the second enable signal $V_{EN2}$ is asserted at time t5. However, because the inhibit signal INH22 is asserted, the second relay driver circuit 520 is prevented from driving the relay 612b, thus preventing the source of the second AC voltage $V_{AC2}$ from being applied to the AC power bus 615.

Responsive to failure of the first AC voltage $V_{AC1}$ at time t6, the first enable signal $V_{EN1}$ is deasserted at time t7. This causes the first relay driver circuit to open the relay 612a, which, in turn, causes the inhibit signal INH22 to be deasserted at time t8. This enables the second relay driver circuit 540 to close the relay 611b, causing the second AC voltage $V_{AC2}$ to be applied to the AC power bus 615. Soon thereafter, the inhibit signal INH12 is asserted at time t9, thus preventing the first relay 612b from being closed concurrently with the second relay 612b.

Prior to the failure of the first AC voltage VAC1 at time t6, subsystem 620 may generate the AC voltage $V'_{ACout}$ from the AC voltage $V_{ACout}$ present on the AC power bus 615. As can be seen from FIG. 7 and the above description thereof, responsive to failure of the first AC voltage $V_{AC1}$, the power transfer apparatus 610 can provide a delay between the opening of the first relay 612a and the closing of the second relay 612b. The delay between the opening of the first relay 612a and the closing of the second relay 612b is generally dependent on characteristics of the relay driver circuits 510, 510. In particular, referring to FIG. 5, delay between assertion of an enable signal $V_{EN1}$, $V_{EN2}$ may be dependent upon capacitance at the base of the relay driving transistors 514, 524. Additional delay may be introduced by the response characteristics of the LED/phototransistor pairs 515/523, 525/513.

Referring to FIG. 6, such delay is generally desirable to prevent concurrent closing of the relays 612a, 612b, and may not be objectionable because the UPS subsystem 620 may provide power during the interval between the opening of the first relay 612a and the closing of the second relay 612b by generating the AC output voltage $V'_{ACout}$ from the battery 630. Upon application of the second AC voltage $V_{AC2}$ following time t8, the UPS subsystem 620 may resume producing the AC voltage $V'_{ACout}$ from the AC voltage $V_{ACout}$ present on the AC power bus 615.

Figure 8:
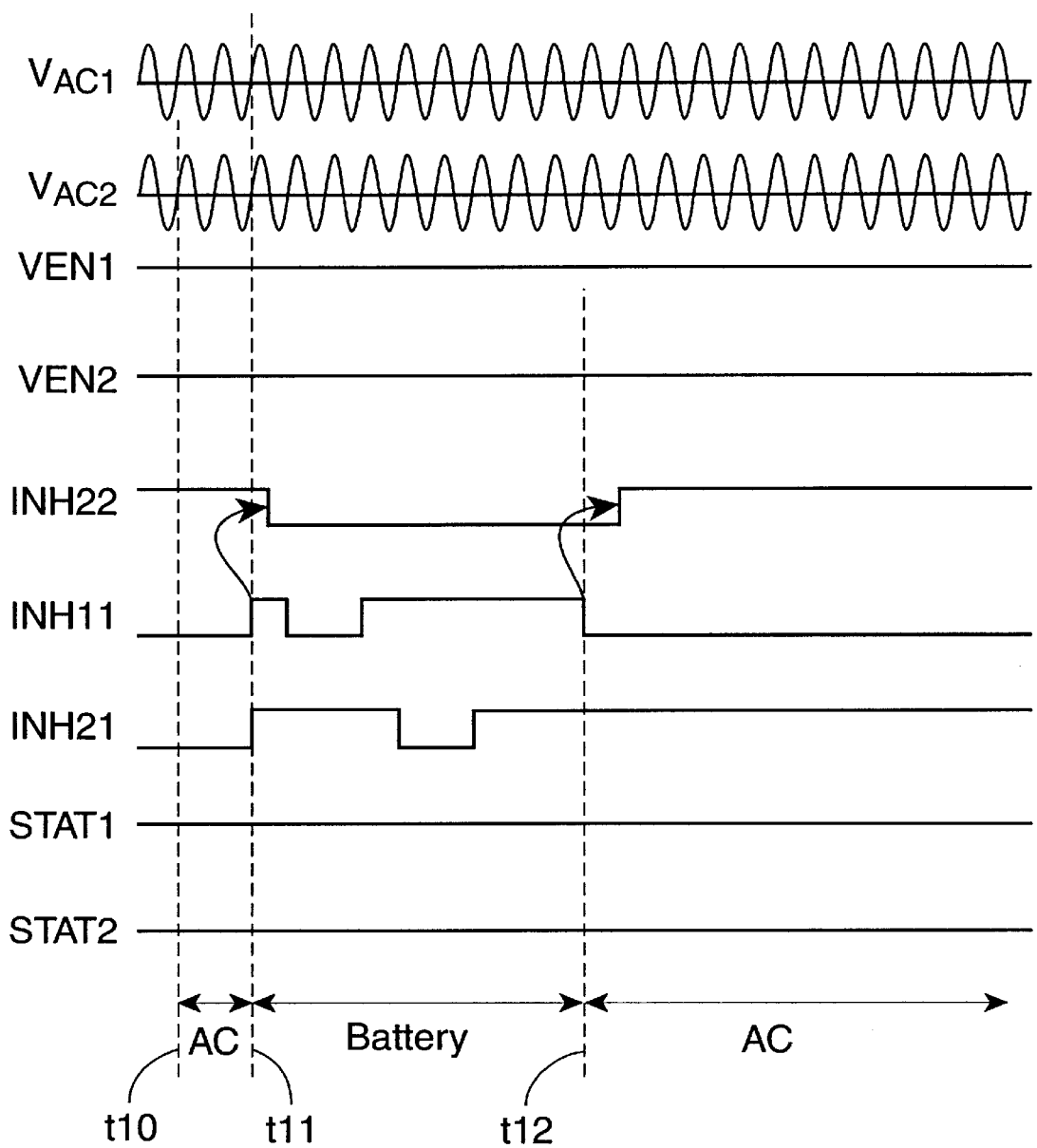

FIG. 8 illustrates other exemplary operations of the UPS system 600 of FIG. 6, in particular, operations for performing a self-test of the power transfer apparatus 610 while maintaining the AC output voltage $V'_{ACout}$. At a time t9, both the first and second AC voltages $V_{AC1}$, $V_{AC2}$ meet predetermined criteria, causing the first and second enable signals $V_{EN1}$, $V_{EN2}$ and the status signals STAT1, STAT2 to be asserted. As shown, at time t10 the first relay 612 is closed, applying the AC voltage $V_{AC1}$ to the AC power bus 615, while the inhibit signal INH22 is asserted, preventing the second relay 612b from closing. At a time t11, the controller 640, via the communications interface circuit 616, asserts both of the inhibit signals INH11, INH21. This causes the first relay driver circuit 510 to open the first relay 612a and maintains the second relay 612b in an open state as the inhibit signal INH22 is deasserted.

Concurrent with, or immediately preceding, the opening of the first relay 612a, the controller 640 may cause the UPS subsystem 620 to disable the rectifier circuit 622 and switch to a battery powered mode of operation to maintain the AC output voltage $V'_{ACout}$. The controller 640 may then engage in a number of different diagnostic procedures for the power transfer circuit 610. For example, the controller 640, via the communications interface circuit 616, may sequentially deassert and assert the inhibit signals INH11, INH21 in an interval following time t11 to operate the relays 612a, 612b, while monitoring the AC voltage $V_{ACout}$ on the AC power bus 615 to determine the status of the relays 612a, 612b. At a time t12, based on the diagnostic results, the controller 640 may select one of the first and second AC voltages $V_{AC1}$, $V_{AC2}$ for application to the AC power bus 615, and concurrently, or soon thereafter, cause the UPS subsystem 620 to return to an AC-powered mode. It will be appreciated the operations illustrated in FIGS. 7 and 8 are provided for illustrative purposes, and that the operations of FIGS. 7 and 8 may be modified and/or supplemented within the scope of the invention.

In the drawings and foregoing description thereof, there have been disclosed typical embodiments of the invention. Terms employed in the description are used in a generic and descriptive sense and not for purposes of limitation, the scope of the invention being set forth in the following claims.

That which is claimed is:

1. A power transfer apparatus for selectively transferring power to an AC power bus from first and second AC power sources, the apparatus comprising:

a first switch operative to couple and decouple the first AC power source to and from the AC power bus responsive to a first control signal;

a second switch operative to couple and decouple the second AC power source to and from the AC power bus responsive to a second control signal;

a first switch control circuit that generates the first control signal responsive to a first AC source voltage produced by the first AC power source and to a first inhibit signal and that generates a second inhibit signal responsive to a state of the first switch; and a second switch control circuit that generates the second control signal responsive to a second AC source voltage produced by the second AC power source and to the second inhibit signal and that generates the first inhibit signal responsive to a state of the second switch.

2. An apparatus according to claim 1, wherein the first switch control circuit comprises:

a voltage detector circuit operative to generate an enable signal responsive to the first AC source voltage;

a driver circuit operative to generate the first control signal responsive to the enable signal and the first inhibit signal; and an inhibit signal generator circuit operative to generate the second inhibit signal responsive to the first control signal.

3. An apparatus according to claim 2:

wherein the first switch comprises a relay including a switching element coupled to the AC power bus and configured to be coupled to the first AC power source and a coil operative to cause the switching element to couple and decouple the AC power source to and from the AC power bus responsive to a current in the coil;

wherein the driver circuit comprises a relay driver circuit that controls the current in the coil responsive to the enable signal and the first inhibit signal; and wherein the inhibit signal generator circuit comprises a current detector circuit operative to generate the second inhibit signal responsive to the current in the coil.

4. An apparatus according to claim 2, wherein the voltage detector circuit comprises an over/under voltage detector circuit operative to assert the enable signal when the first AC source voltage is within a predetermined voltage window and to deassert the enable signal when the first AC source voltage is outside of the predetermined voltage window.

5. An apparatus according to claim 1:

wherein the first switch control circuit is further operative to cause the first switch to couple the first AC power source to the AC power bus when the first AC source voltage meets a first predetermined criterion and the first inhibit signal is deasserted;

wherein the first switch control circuit is further operative to cause the first switch to decouple the first AC power source from the AC power bus when the first AC source voltage fails to meet the first predetermined criterion; and wherein the first switch control circuit is further operative to cause the first switch to decouple the first AC power source from the AC power bus when the first inhibit signal is asserted.

6. An apparatus according to claim 5:

wherein the second switch control circuit is further operative to cause the second switch to couple the second AC power source to the AC power bus when the second AC source voltage meets a second predetermined criterion and the second inhibit signal is deasserted;

wherein the second switch control circuit is further operative to cause the second switch to decouple the second AC power source from the AC power bus when the second AC source voltage fails to meet the second predetermined criterion; and wherein the second switch control circuit is further operative to cause the second switch to decouple the second AC power source from the AC power bus when the second inhibit signal is asserted.

7. An apparatus according to claim 1:

wherein the first switch control circuit is further operative to assert the second inhibit signal when the first switch couples the first AC power source to the AC power bus, to maintain assertion of the second inhibit signal for a first predetermined interval following decoupling of the first AC power source from the AC power bus, and to deassert the second inhibit signal following the first predetermined interval; and wherein the second switch control circuit is further operative to cause the second switch to decouple the second AC power source from the AC power bus responsive to assertion of the second inhibit signal.

8. An apparatus according to claim 7:

wherein the second switch control circuit is further operative to assert the first inhibit signal when the second switch couples the second AC power source to the AC power bus, to maintain assertion of the first inhibit signal for a second predetermined interval following decoupling of the second AC power source from the AC power bus, and to deassert the first inhibit signal following the second predetermined interval; and wherein the first switch control circuit is further operative to cause the first switch to decouple the first AC power source from the AC power bus responsive to assertion of the first inhibit signal.

9. An apparatus according to claim 1, wherein the first and second switch control circuits are galvanically isolated from one another.

10. An apparatus according to claim 1, wherein the first and second inhibit signals comprise respective optical signals.

11. An apparatus according to claim 1:

wherein the first switch control circuit is further operative to generate the first control signal responsive to the first AC source voltage, to the first inhibit signal and to a third inhibit signal; and wherein the second switch control is further operative to generate the second control signal responsive to the second AC source voltage, to the second inhibit signal and to a fourth inhibit signal; and wherein the apparatus further comprises:
a communications interface circuit configured to receive external signals on an external signal line and operative to generate the third and fourth inhibit signals responsive thereto.

12. An apparatus according to claim 11:

wherein the first switch control circuit is further operative to generate a first status signal that is indicative of a status of the first switch control circuit;

wherein the second switch control circuit is further operative to generate a second status signal that is indicative of a status of the second switch control circuit; and wherein the communications interface circuit is configured to receive the first and second status signals and operative to transmit signals on the external signal line responsive to the first and second status signals.

13. An apparatus according to claim 12:

wherein the first status signal is indicative of a magnitude of the first AC source voltage; and wherein the second status signal is indicative of a magnitude of the second AC source voltage.

14. An apparatus according to claim 12, wherein the first switch control circuit, the second switch control circuit and the communications interface circuit are galvanically isolated from one another.

15. An apparatus according to claim 14, wherein the first inhibit signal, the second inhibit signal, the third inhibit signal, the fourth inhibit signal, the first status signal and the second status signals comprise respective optical signals.

16. An uninterruptible power supply (UPS) system, comprising:

an AC power bus;

a first switch operative to couple and decouple a first AC power source to and from the AC power bus responsive to a first control signal;

a second switch operative to couple and decouple a second AC power source to and from the AC power bus responsive to a second control signal;

a first switch control circuit that generates the first control signal responsive to a first AC source voltage produced by the first AC power source and to a first inhibit signal and that generates a second inhibit signal responsive to a state of the first switch;

a second switch control circuit that generates the second control signal responsive to a second AC source voltage produced by the second AC power source and to the second inhibit signal and that generates the first inhibit signal responsive to a state of the second switch; and a UPS subsystem having a first input coupled to the AC power bus and a second input configured to be coupled to a DC power source, the UPS subsystem operative to generate an AC output voltage from an AC voltage at the first input or from a DC voltage at the second input.

17. A system according to claim 16, wherein the first switch control circuit comprises:

a voltage detector circuit operative to generate an enable signal responsive to the first AC source voltage;

a driver circuit operative to generate the first control signal responsive to the enable signal and the first inhibit signal; and an inhibit signal generator circuit operative to generate the second inhibit signal responsive to the first control signal.

18. A system according to claim 17:

wherein the first switch comprises a relay including a switching element coupled to the AC power bus and configured to be coupled to the first AC power source and a coil operative to cause the switching element to couple and decouple the AC power source to and from the AC power bus responsive to a current in the coil;

wherein the first control signal comprises the current in the coil;

wherein the driver circuit comprises a relay driver circuit that controls the current in the coil responsive to the enable signal and the first inhibit signal; and wherein the inhibit signal generator circuit comprises a current detector circuit operative to generate the second inhibit signal responsive to the current in the coil.

19. A system according to claim 17, wherein the voltage detector circuit comprises an over/under voltage detector circuit operative to assert the enable signal when the first AC source voltage is within a predetermined voltage window and to deassert the enable signal when the first AC source voltage is outside of the predetermined voltage window.

20. A system according to claim 16:

wherein the first switch control circuit is further operative to assert the second inhibit signal when the first switch couples the first AC power source to the AC power bus, to maintain assertion of the second inhibit signal for a first predetermined interval following decoupling of the first AC power source from the AC power bus, and to deassert the second inhibit signal following the first predetermined interval; and wherein the second switch control circuit is further operative to cause the second switch to decouple the second AC power source from the AC power bus responsive to assertion of the second inhibit signal.

21. A system according to claim 20:
wherein the second switch control circuit is further operative to assert the first inhibit signal when the second switch couples the second AC power source to the AC power bus, to maintain assertion of the first inhibit signal for a second predetermined interval following decoupling of the second AC power source from the AC power bus, and to deassert the first inhibit signal following the second predetermined interval; and
wherein the first switch control circuit is further operative to cause the first switch to decouple the first AC power source from the AC power bus responsive to assertion of the first inhibit signal.

22. A system according to claim 21, wherein the UPS subsystem is operative to generate the AC output voltage from a DC voltage at the second input in the first and second predetermined intervals.

23. A system according to claim 16, wherein the first and second switch control circuits are galvanically isolated from one another.

24. A system according to claim 16, wherein the first and second inhibit signals comprise respective optical signals.

25. A system according to claim 16:
wherein the first switch control circuit is further operative to generate the first control signal responsive to the first AC source voltage, to the first inhibit signal and to a third inhibit signal; and
wherein the second switch control is further operative to generate the second control signal responsive to the second AC source voltage, to the second inhibit signal and to a fourth inhibit signal; and
wherein the system further comprises:
a communications interface circuit configured to receive externally-applied signals on an external signal line and operative to generate the third and fourth inhibit signals responsive thereto; and
a controller circuit coupled to the UPS subsystem and to the external signal line and operative to generate the externally applied signals.

26. A system according to claim 25, wherein the controller circuit is operative to generate signals on the external signal line that cause the first and second control circuits to decouple the first and second AC power sources from the AC power bus and to cause the UPS subsystem to concurrently generate the AC output voltage from the DC power source.

27. A system according to claim 25:
wherein the first switch control circuit is further operative to generate a first status signal that is indicative of a status of the first switch control circuit;
wherein the second switch control circuit is further operative to generate a second status signal that is indicative of a status of the second switch control circuit;
wherein the communications interface circuit is configured to receive the first and second status signals and operative to transmit signals on the external signal line responsive to the first and second status signals; and
wherein the controller circuit is operative to receive the transmitted signals.

28. A system according to claim 27, wherein the controller circuit is operative, responsive to the first and second status signals, to cause the UPS subsystem to generate the AC output voltage from the DC voltage at the second input when the first and second AC source voltages are unacceptable.

29. A system according to claim 27:
wherein the first status signal is indicative of a magnitude of the first AC source voltage; and
wherein the second status signal is indicative of a magnitude of the second AC source voltage.

30. A system according to claim 27, wherein the first switch control circuit, the second switch control circuit and the communications interface circuit are galvanically isolated from one another.

31. A system according to claim 27, wherein the first inhibit signal, the second inhibit signal, the third inhibit signal, the fourth inhibit signal, the first status signal and the second status signals comprise respective optical signals.

32. A method of selectively transferring power to an AC power bus from first and second AC power sources, the method comprising:
providing first and second switches that are operative to couple and decouple the first and second AC power sources to and from the AC power bus responsive to first and second control signals;
generating the first control signal responsive to a first AC source voltage produced by the first AC power source and to a first inhibit signal;
generating the second control signal responsive to a second AC source voltage produced by the second AC power source and to a second inhibit signal;
generating the first inhibit signal responsive to a state of the second switch; and
generating the second inhibit signal responsive to a state of the first switch.

33. A method according to claim 32, further comprising selectively generating an AC voltage from an AC voltage on the AC power bus or from a DC voltage produced by a DC power source.

34. A method according to claim 32, wherein generating the second inhibit signal comprises generating the second inhibit signal responsive to the first control signal.

35. A method according to claim 32, wherein generating the first control signal comprises:
generating an enable signal responsive to the first AC source voltage; and
generating the first control signal responsive to the enable signal and to the first inhibit signal.

36. A method according to claim 35:
wherein the first switch comprises a relay including a switching element coupled to the AC power bus and configured to be coupled to the first AC power source and a coil operative to cause the switching element to couple and decouple the AC power source to and from the AC power bus responsive to a current in the coil; and
wherein generating the first control signal responsive to the enable signal and to the first inhibit signal comprises controlling a current in the coil responsive to the enable signal and to the first inhibit signal.

37. A method according to claim 36:
wherein generating the second inhibit signal comprises generating the second inhibit signal responsive to the current in the coil.

38. A method according to claim 35, wherein generating the enable signal comprises:
asserting the enable signal when the first AC source voltage is within a predetermined voltage window; and
deasserting the enable signal when the first AC source voltage is outside the predetermined voltage window.

39. A method according to claim 32, wherein generating the first control signal comprises:
generating the first control signal such that the first switch couples the first AC power source to the AC power bus when the first AC source voltage meets a first predetermined criterion and the first inhibit signal is deasserted;

generating the first control signal such that the first switch decouples the first AC power source from the AC power bus when the first AC source voltage fails to meet the first predetermined criterion; and generating the first control signal such that the first switch decouples the first AC power source from the AC power bus when the first inhibit signal is asserted.

40. A method according to claim 32:

wherein generating the second inhibit signal comprises:
  asserting the second inhibit signal when the first switch couples the first AC power source to the AC power bus;
  continuing assertion of the second inhibit signal for a predetermined interval following decoupling of the first AC power source from the AC power bus; and
  deasserting the second inhibit signal following the predetermined interval; and wherein generating the second control signal comprises generating the second control signal such that the second switch decouples the second AC power source from the AC power bus responsive to assertion of the second inhibit signal.

41. A method according to claim 40, wherein a UPS is coupled to the AC power bus, and wherein the method further comprises operating the UPS such that it generates an AC output voltage from a DC power source in the predetermined interval.

42. A method according to claim 32, wherein the first and second inhibit signals comprise respective optical signals.

43. A method according to claim 32:

wherein generating the first control signal comprises generating the first control signal responsive to the first AC source voltage, to the first inhibit signal and to a third inhibit signal;

wherein generating the second control signal comprises generating the second control signal responsive to the second AC source voltage, to the second inhibit signal and to a fourth inhibit signal; and wherein the method further comprises:
  receiving external signals at a communications interface circuit; and
  generating the third and fourth inhibit signals responsive to the received external signals.

44. A method according to claim 43, further comprising:

generating a first status signal that is indicative of a status of the first switch control circuit;

generating a second status signal that is indicative of a status of the second switch control circuit;

receiving the first and second status signals at the communications interface circuit; and transmitting signals from the communications interface circuit responsive to the first and second status signals.

45. A method according to claim 44:

wherein the first status signal is indicative of a magnitude of the first AC source voltage; and wherein the second status signal is indicative of a magnitude of the second AC source voltage.

* * * * *